US010209734B2

(12) United States Patent
Lee et al.

(10) Patent No.: US 10,209,734 B2
(45) Date of Patent: Feb. 19, 2019

(54) SEMICONDUCTOR DEVICE, SEMICONDUCTOR SYSTEM, AND METHOD OF OPERATING THE SEMICONDUCTOR DEVICE

(71) Applicant: SAMSUNG ELECTRONICS CO., LTD., Suwon-si, Gyeonggi-Do (KR)

(72) Inventors: Min Joung Lee, Suwon-si (KR); Suk Nam Kwon, Seongnam-si (KR); Jae Gon Lee, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 139 days.

(21) Appl. No.: 15/415,162

(22) Filed: Jan. 25, 2017

(65) Prior Publication Data

US 2017/0212550 A1 Jul. 27, 2017

Related U.S. Application Data

(60) Provisional application No. 62/286,891, filed on Jan. 25, 2016, provisional application No. 62/286,860, filed on Jan. 25, 2016.

(30) Foreign Application Priority Data

Jan. 3, 2017 (KR) ........................ 10-2017-0000605
Jan. 24, 2017 (KR) ........................ 10-2017-0010945

(51) Int. Cl.
*G06F 1/32* (2006.01)
*G06F 1/04* (2006.01)
*G06F 21/72* (2013.01)

(52) U.S. Cl.
CPC .............. *G06F 1/04* (2013.01); *G06F 1/3203* (2013.01); *G06F 21/725* (2013.01)

(58) Field of Classification Search
CPC ..... G06F 1/12; G06F 1/14; G06F 1/10; G06F 5/06; G06F 13/1689; G06F 1/08;
(Continued)

(56) References Cited

U.S. PATENT DOCUMENTS 5,655,127 A 8/1997 Rabe et al.
5,661,751 A 8/1997 Johnson
(Continued)

OTHER PUBLICATIONS

Office Action dated Aug. 28, 2018 in corresponding U.S. Appl. No. 15/414,819.
(Continued)

*Primary Examiner* — Zahid Choudhury
(74) *Attorney, Agent, or Firm* — F. Chau & Associates, LLC

(57) ABSTRACT

A clock management unit (CMU) includes a first clock control circuit controlling a first clock source, a second clock control circuit sending a first clock request to the first clock control circuit in response to an intellectual property (IP) block clock request from an IP block and controlling a second clock source, and a CMU controller. The second clock source receives a clock signal from the first clock source. A power management unit (PMU) sends a PMU clock request to the CMU controller. The CMU provides the clock signal to the IP block in response to the PMU clock request.

20 Claims, 17 Drawing Sheets

(58) Field of Classification Search
CPC ........ G06F 1/04; G06F 1/3202; G06F 9/4825; G06F 11/0757; G06F 11/3419; G11C 7/22
See application file for complete search history.

(56) References Cited

U.S. PATENT DOCUMENTS

| | | | |
|---|---|---|---|
| 5,793,993 | A | 8/1998 | Broedner et al. |
| 6,021,501 | A * | 2/2000 | Shay .................. G06F 1/04 713/322 |
| 6,654,898 | B1 | 11/2003 | Bailey et al. |
| 6,889,331 | B2 | 5/2005 | Soerensen et al. |
| 6,915,438 | B2 | 7/2005 | Boros |
| 6,927,604 | B2 | 8/2005 | Boerstler et al. |
| 7,111,183 | B1 | 9/2006 | Klein et al. |
| 7,174,467 | B1 | 2/2007 | Helms et al. |
| 7,245,161 | B2 | 7/2007 | Boerstler et al. |
| 7,971,086 | B2 | 6/2011 | Itkin |
| 8,656,196 | B2 | 2/2014 | De Cesare et al. |
| 8,826,047 | B1 | 9/2014 | Zhu et al. |
| 8,996,906 | B1 * | 3/2015 | Townley ............ G06F 1/06 713/600 |
| 9,081,517 | B2 | 7/2015 | Koniaris et al. |
| 9,766,648 | B2 | 9/2017 | Hashim et al. |
| 2002/0152407 | A1 | 10/2002 | Alia et al. |
| 2003/0117176 | A1 | 6/2003 | Tardieux et al. |
| 2004/0153678 | A1 | 8/2004 | Ahmad et al. |
| 2004/0243874 | A1 * | 12/2004 | Byers .................. G06F 1/04 713/500 |
| 2005/0232218 | A1 | 10/2005 | Edwards et al. |
| 2006/0161797 | A1 | 7/2006 | Grass et al. |
| 2006/0248367 | A1 | 11/2006 | Fischer et al. |
| 2008/0301604 | A1 | 12/2008 | Itskovich et al. |
| 2011/0050300 | A1 * | 3/2011 | Klapproth ............ G06F 1/08 327/144 |
| 2011/0202788 | A1 | 8/2011 | Hesse et al. |
| 2012/0131370 | A1 | 5/2012 | Wang et al. |
| 2013/0055004 | A1 | 2/2013 | Koniaris et al. |
| 2013/0124895 | A1 | 5/2013 | Saha et al. |
| 2013/0173951 | A1 * | 7/2013 | Vogel .................. G06F 1/10 713/600 |
| 2014/0082396 | A1 | 3/2014 | Vahidsafa et al. |
| 2014/0089697 | A1 | 3/2014 | Kim et al. |
| 2014/0266333 | A1 | 9/2014 | Jouin et al. |
| 2015/0200669 | A1 | 7/2015 | Cai et al. |
| 2015/0373313 | A1 | 12/2015 | Kinebuchi et al. |
| 2016/0116934 | A1 | 4/2016 | Ha |

OTHER PUBLICATIONS

Office Action dated Jul. 5, 2018 in corresponding U.S. Appl. No. 15/415,041.
Office Action dated Jul. 9, 2018 in corresponding U.S. Appl. No. 15/414,969.
Office Action dated Oct. 4, 2018 in corresponding U.S. Appl. No. 15/415,020.

* cited by examiner

1200

1300

1400

SEMICONDUCTOR DEVICE, SEMICONDUCTOR SYSTEM, AND METHOD OF OPERATING THE SEMICONDUCTOR DEVICE

This application claims priority under 35 U.S.C. § 119 to U.S. Provisional Patent Application No. 62/286,891 filed on Jan. 25, 2016 and No. 62/286,860 filed on Jan. 25, 2016 in the United States Patent and Trademark Office and Korean Patent Application No. 10-2017-0000605 filed on Jan. 3, 2017 and 10-2017-0010945 filed on Jan. 24, 2017 in the Korean Intellectual Property Office, the disclosures of which are incorporated by reference herein in their entireties.

TECHNICAL FIELD

The present inventive concept relates to a semiconductor device, a semiconductor system, and a method of operating the semiconductor device.

DISCUSSION OF RELATED ART

A system-on-chip (SOC) may include one or more intellectual property (IP) blocks, a clock management unit (CMU), and a power management unit (PMU). The CMU provides a clock signal to the IP blocks. IP blocks are IP core or reusable unit of logic or chip layout in a design of a semiconductor device. Also, the CMU stops providing the clock signal to an IP block that is not in operation, and thus reduces the waste of resources in a system that employs the SOC.

To control the provision of the clock signal, various clock sources included in the CMU, such as, for example, a multiplexer (MUX) circuit, a clock dividing circuit, a short stop circuit, and a clock gating circuit, may be controlled by software using a special function register (SFR). However, the control of the clock sources of the CMU using software may be slower than the control of the clock sources of the CMU using hardware. Thus, a method is needed to control the clock sources of the CMU hardware-wise.

SUMMARY

According to an exemplary embodiment of the present inventive concept, a semiconductor device is provided as follows. A clock management unit (CMU) includes a first clock control circuit controlling a first clock source, a second clock control circuit sending a first clock request to the first clock control circuit in response to an intellectual property (IP) block clock request from an IP block and controlling a second clock source, and a CMU controller. The second clock source receives a clock signal from the first clock source. A power management unit (PMU) sends a PMU clock request to the CMU controller. The CMU provides the clock signal to the IP block in response to the PMU clock request.

According to an exemplary embodiment of the present inventive concept, a semiconductor device is provided as follows. A CMU includes a first clock control circuit controlling a first clock source, a second clock control circuit sending a first clock request to the first clock control circuit in response to an IP block clock request from an IP block, controlling a second clock source, the second clock source receiving a clock signal from the first clock source, and a CMU controller. A PMU sends a control command to the CMU controller and receives an acknowledgement from the CMU controller after the CMU controller performs the control command received from the PMU. The CMU provides the clock signal to the IP block in response to control command.

According to an exemplary embodiment of the present inventive concept, a semiconductor system includes a system-on-chip (SoC) and at least one external device electrically connected to the SoC. The SoC includes at least one IP block, a CMU providing a clock signal to the at least one IP block, a PMU sending a PMU clock request and a control command to the CMU to control the clock signal provided to the at least one IP block. The CMU includes a first clock control circuit controlling a first clock source, a second clock control circuit sending a first clock request to the first clock control circuit in response to an IP block clock request from the at least one IP block, controlling a second clock source, the second clock source receiving a clock signal from the first clock source.

According to an exemplary embodiment of the present inventive concept, a method of operating a semiconductor device is provided as follows. A control command is received from a PMU for controlling a clock signal provided to an IP block. The clock signal is controlled according to the control command using first and second clock control circuits. An acknowledgement is sent to the PMU after the control command is performed. The first clock control circuit controls a first clock source. The second clock control circuit sends a first clock request to the first clock control circuit in response to an IP block clock request from the IP block and controls a second clock source receiving the clock signal from the first clock source.

According to an exemplary embodiment of the present inventive concept, a semiconductor device is provided as follows. A clock source generates a clock signal. A plurality of clock components includes a root clock component and a leaf clock component. The clock signal passes through the plurality of clock components. The clock source is coupled to the root clock component. A channel management circuit is coupled to the leaf clock component. An intellectual property (IP) block is coupled to the channel management circuit and receives the clock signal. A CMU controller is coupled to the root clock component and the channel management circuit. A PMU is coupled to the CMU controller. The plurality of clock components is configured to send a clock request signal from the leaf clock component to the root clock component in response to an intellectual property (IP) block clock request and transfer the clock signal from the root clock component to the leaf clock component in response to an acknowledgement from a previous clock component.

BRIEF DESCRIPTION OF THE DRAWINGS

These and other features of the inventive concept will become more apparent by describing in detail exemplary embodiments thereof with reference to the accompanying drawings of which.

DETAILED DESCRIPTION OF EXEMPLARY EMBODIMENTS

Figure 1:
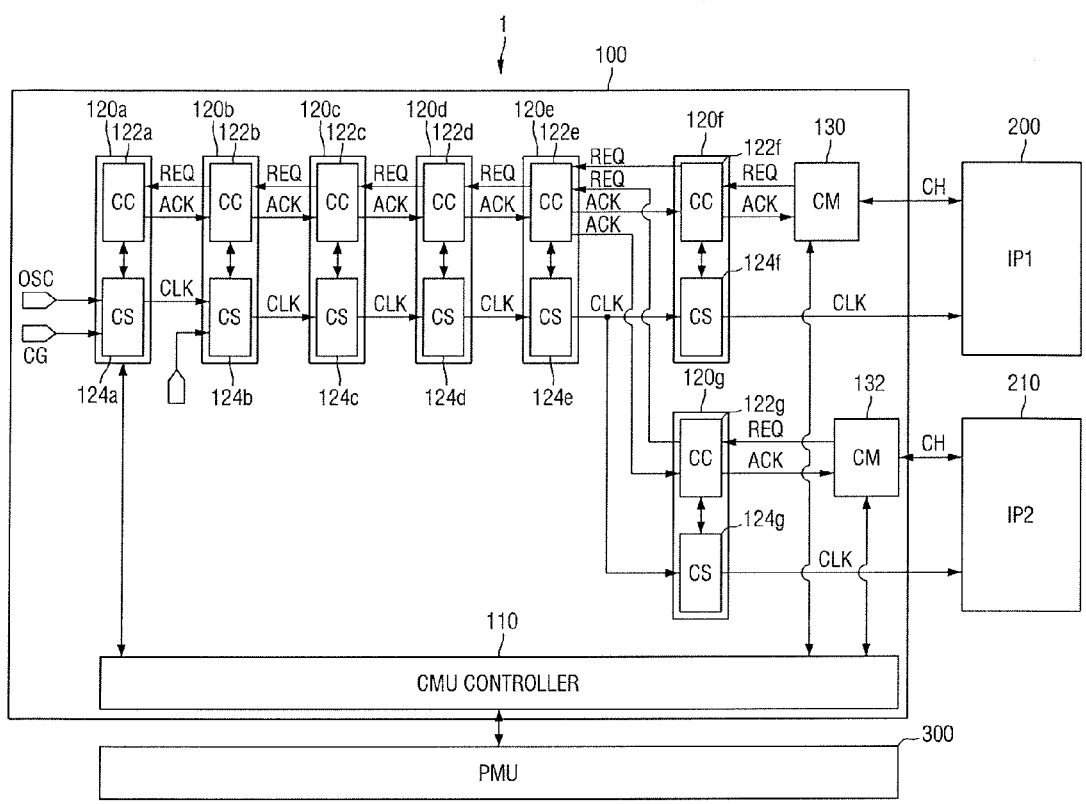
FIG. 1 is a schematic view illustrating a semiconductor device according to an Example embodiment of the present inventive concept.

Exemplary embodiments of the inventive concept will be described below in detail with reference to the accompanying drawings. However, the inventive concept may be embodied in different forms and should not be construed as limited to the embodiments set forth herein. In the drawings, the thickness of layers and regions may be exaggerated for clarity. It will also be understood that when an element is referred to as being "on" another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

FIG. 1 is a schematic view illustrating a semiconductor device according to an exemplary embodiment of the present inventive concept.

Referring to FIG. 1, a semiconductor device 1 includes a clock management unit (CMU) 100, intellectual property (IP) blocks 200 and 210, and a power management unit (PMU) 300. The semiconductor device 1 may be implemented as a system-on-chip (SoC), but the present inventive concept is not limited thereto.

The CMU 100 provides a clock signal to the IP blocks 200 and 210. The CMU 100 includes clock components 120a through 120g, channel management circuits 130 and 132, and a CMU controller 110. The clock components 120a through 120g generate a clock signal to be provided to the IP blocks 200 and 210, and the channel management circuits 130 and 132. The channel management circuit 130 is disposed between the clock component 120f and the IP block 200. The channel management circuit 132 is disposed between the clock component 120g and the IP block 210. The channel management circuit 130 serve to provide a first communication channel CH1 between the IP block 200 and the CMU 100. The channel management circuit 132 serves to provide a second communication channel CH2 between the IP block 210 and the CMU 100. The CMU controller 110 provides a clock signal CLK to the IP blocks 200 and 210 by using the clock components 120a through 120g.

In an exemplary embodiment, the communication channels CH1 and CH2 include a Q-channel interface or a P-channel interface as defined in the ARM® Low Power Interface (LPI) Specification, but the present inventive concept is not limited thereto. For example, the communication channels CH1 and CH2 may include an arbitrary communication protocol determined according to the purpose of implementation of the semiconductor device 1.

The clock components 120a through 120g may include clock sources 124a through 124g, respectively, and clock control circuits 122a through 122g, respectively, and the clock control circuits 122a through 122g control the clock sources 124a through 124g, respectively. The clock sources 124a through 124g may include multiplexer (MUX) circuits, clock dividing circuits, short stop circuits, or clock gating circuits.

The clock components 120a through 120g may have a parent-child relationship with one another. The clock component 120a is the parent of the clock component 120b, and the clock component 120b is the child of the clock component 120a and the parent of the clock component 120c. The clock component 120e is the parent of the clock components 120f and 120g, and the clock components 120f and 120g are the children of the clock component 120e. The clock component 120a, which is disposed closest to a clock generator, for example, a phase locked loop (PLL), is a root clock component, and the clock components 120f and 120g, which are disposed closest to the IP blocks 200 and 210, are leaf clock components. Since the clock components 120a through 120g have a parent-child relationship with one another, the clock control circuits 122a through 122g may also have a parent-child relationship with one another, and the clock sources 124a through 124g may also have a parent-child relationship with one another.

The clock control circuits 122a through 122g may exchange a clock request REQ and an acknowledgement ACK with one another and may provide a clock signal to the IP blocks 200 and 210.

For example, in a case in which the IP block 200 is not in need of a clock signal, for example, in a case in which the IP block 200 needs to be placed in a sleep state, the CMU 100 may stop providing a clock signal to the IP block 200. More specifically, the channel management circuit 130 may transmit a first signal indicating that the provision of a clock signal is to be stopped to the IP block 200 under the control of the CMU 100 or the CMU controller 110. In response to the receipt of the first signal, the IP block 200 transmits a second signal indicating that the provision of a clock signal may be stopped after completing a task currently being performed to the channel management circuit 130. In response to the receipt of the second signal from the IP block 200, the channel management circuit 130 requests its parent, i.e., the clock component 120f, to stop providing a clock signal.

For example, in a case in which the first communication channel CH1, which is provided by the channel management circuit 130, conforms to a Q-channel interface, the channel management circuit 130 sends a "QREQn" signal having a first logic value (e.g., a logic low level L) to the IP block 200 as the first signal. Thereafter, the channel management circuit 130 receives a "QACCEPTn" signal having the first logic value from the IP block 200 as the second signal and sends a clock request REQ having, for example, the first logic value, to the clock component 120f. In this example, the clock request REQ having the first logic value may be a "clock provision termination request".

In response to the receipt of the clock request REQ having the first logic value, i.e., the clock provision termination request, from the channel management circuit 130, the clock control circuit 122f stops providing a clock signal by disabling the clock source 124f (e.g., a clock gating circuit). As a result, the IP block 200 may enter a sleep mode. In this process, the clock control circuit 122f may provide an acknowledgement ACK having the first logic value to the channel management circuit 130. The channel management circuit 130's receipt of the acknowledgement ACK having the first logic value for the clock provision termination request does not necessarily guarantee that the provision of a clock signal from the clock source 124f will be stopped. Rather, the receipt of the acknowledgement ACK having the first logic value simply means that the clock control circuit 122f recognizes that the clock component 120f, which is the parent of the channel management circuit 130, no longer needs to provide a clock signal to the channel management circuit 130.

Meanwhile, the clock control circuit 122f of the clock component 120f sends the clock request REQ having the first logic value to its parent, i.e., the clock control circuit 122e of the clock component 120e. If the IP block 210 also does not need a clock signal, for example, if the clock control circuit 122e receives the clock provision termination request from the clock control circuit 122g, the clock control circuit 122e disables the clock source 124e (e.g., a clock dividing circuit) to stop providing a clock signal. As a result, the IP blocks 200 and 210 may enter the sleep mode.

The aforementioned operation performed by the clock control circuit 122f may also be performed by other clock control circuits, for example, the clock control circuits 122a through 122d.

In an exemplary embodiment, in a case in which the clock control circuit 122f of the clock component 120f sends the clock request REQ having the first logic value to its parent, i.e., the clock control circuit 122e of the clock component 120e, but the IP block 210 is still in a run mode, the clock control circuit 122e does not disable the clock source 124e. The clock control circuit 122e disables the clock source 124e and send the clock request REQ having the first logic value to its parent, i.e., the clock control circuit 120d, only when the IP block 210 does not need a clock signal. For example, the clock control circuit 122e disables the clock source 124e only after the receipt of the clock provision termination request from both its children, i.e., the clock control circuits 122f and 122g.

In a case in which the clock sources 124a through 124f are all disabled because of the IP blocks 200 and 210 being in the sleep mode and then the IP block 200 is placed into the run mode, the CMU 100 may resume providing a clock signal to the IP blocks 200 and 210.

The channel management circuit 130 sends a clock request REQ having a second logic value (for example, a logic high level H) to its parent, i.e., the clock control circuit 122f of the clock component 120f, and waits for an acknowledgement ACK to be received from the clock control circuit 122f. Here, the clock request REQ having the second logical value may be a "clock provision request", and the receipt of an acknowledgement ACK for the clock provision request means that the provision of a clock signal from the clock source 124f has been resumed. The clock control circuit 122f cannot immediately enable the clock source 124f (e.g., a clock gating circuit), but waits for a clock signal to be provided from its parent.

Thereafter, the clock control circuit 122f sends the clock request REQ having the second logic value, i.e., the clock provision request, to its parent, i.e., the clock control circuit 122e, and waits for an acknowledgement ACK to be received from the clock control circuit 122e. The aforementioned operation performed by the clock control circuit 122f may also be performed by other clock control circuits, for example, the clock control circuits 122a through 122d.

In response to the receipt of the clock request REQ having the second logic value from the clock control circuit 122b, the clock control circuit 122a, which is the root clock component, enables the clock source 124a (e.g., a MUX circuit) and sends an acknowledgement ACK to the clock control circuit 122b. In this manner, the clock sources 124b through 124e are sequentially enabled. Then, the clock control circuit 122e sends an acknowledgement ACK indicating that the provision of a clock signal from the clock source 124e has been resumed to the clock control circuit 122f. In response to the receipt of the acknowledgement ACK sent by the clock control circuit 122e, the clock control circuit 122f enables the clock source 124f to provide a clock signal to the IP block 200 and provides an acknowledgement ACK to the channel management circuit 130.

The clock control circuits 122a through 122g may be operated in a handshake manner by exchanging a clock request REQ and an acknowledgement ACK signal with one another. For example, a first clock chain including the clock control circuits 122a through 122e and the clock control circuit 122f and a second clock chain including the clock control circuits 122a through 122e and the clock control circuit 122g are operated in a handshake manner using the clock request REQ and the acknowledgement ACK. Accordingly, the clock control circuits 122a through 122g can control the provision of a clock signal to the IP blocks 200 and 210 by controlling the clock sources 124a through 124g hardware-wise.

The clock control circuits 122a through 122g may be driven to transmit a clock request REQ to their respective parents or to control the clock sources 124a through 124g, respectively, or may be operated under the control of the CMU controller 110. In an exemplary embodiment, the clock control circuits 122a through 122g may include finite state machines (FSMs), which control the clock sources 124a through 124g according to clock requests REQ transmitted among the clock control circuits 122a through 122g.

Figure 2:
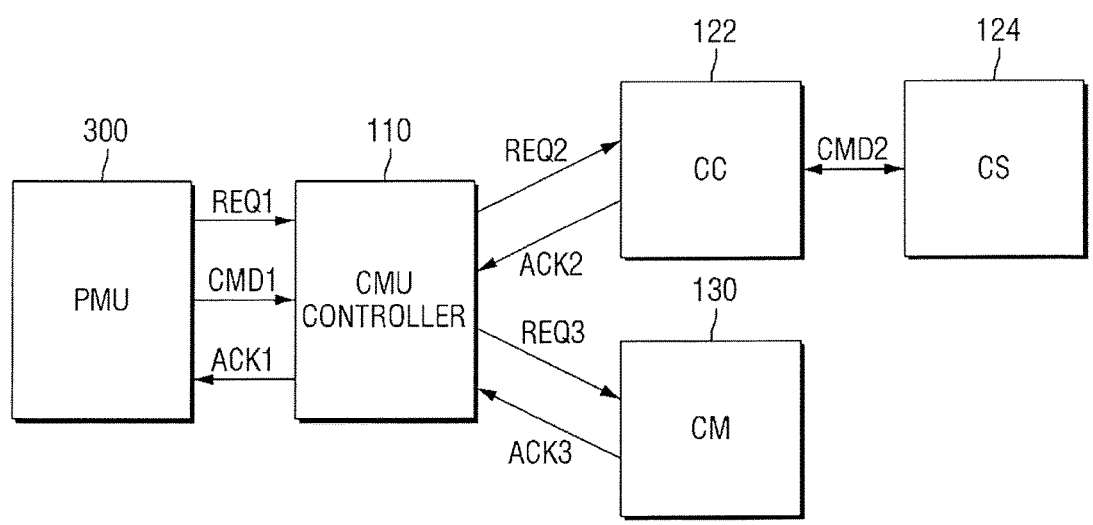
FIG. 2 is a schematic view illustrating a method of operating a semiconductor device according to an Example embodiment of the present inventive concept.

FIG. 2 is a schematic view illustrating a method of operating a semiconductor device according to an exemplary embodiment of the present inventive concept.

Referring to FIG. 2, the PMU 300 of the semiconductor device 1 sends a PMU clock request REQ1 to the CMU controller 110 to perform power control on the IP blocks 200 and 210. The PMU clock request REQ1 is a request to change the state of the CMU 100.

The PMU 300 also sends a control command CMD1 to the CMU controller 110 along with the PMU clock request REQ1. The control command CMD1 includes data for changing the state of the CMU 100. In an exemplary embodiment, the control command CMD1 may be implemented as m-bit data (where m is a natural number). In an exemplary embodiments, the control command CMD1 may include a PLL deactivation command, a forced hardware automatic clock gating command, a clock-on command, a clock-off command, a bus transaction termination command, or the like, and each of these commands will be described later in detail with reference to FIGS. 3 to 10.

The CMU controller 110 controls the clock control circuits 122a through 122g or the channel management circuit 130 and 132 according to the control command CMD1 and sends an acknowledgement ACK1 to the PMU 300. For example, in response to the CMU controller 110 sending a clock request REQ2 to the clock control circuit 122 according to the control command CMD1, the clock control circuit 122 controls the clock source 124 according to the clock request REQ2 and sends an acknowledgement ACK2 to the CMU controller 110, and then, the CMU controller 110 sends the acknowledgement ACK1 for the control command CMD1 to the PMU 300. In an exemplary embodiment, in response to the CMU controller 110 sending a clock request REQ3 to the channel management circuit 130 according to the control command CMD1, the channel management circuit 130 performs an operation corresponding to the clock request REQ3 on the IP block 200 and sends an acknowledgement ACK3 to the CMU controller 110, and then, the CMU controller 110 sends the acknowledgement ACK1 for the control command CMD1 to the PMU 300.

For example, the CMU controller 110 may issue the acknowledgement ACK1 to the PMU 300 after performing the PMU clock request REQ1 by sending the clock request REQ2 to 122 and the clock request REQ2 to the PMU 300 and receiving the acknowledgement ACK2 from 122 and the acknowledgement ACK3 from the PMU 300.

The interface between the PMU 300 and the CMU controller 110 is an asynchronous interface, and may be implemented in a handshake manner, as mentioned above with reference to FIG. 1.

The PMU 300 performs a power control operation on the IP blocks 200 and 210 by using the control command CMD1. In some Example embodiments, the power control operation may include, but is not limited to, at least one of a power gating operation, a power-on operation, a power-off operation, and a clock gating operation for power management. The clock gating operation for power management involves gating a clock signal generated by each of the clock sources 124a through 124g according to a predetermined power management policy. The power control operation may include various control operations other than those set forth herein, depending on the purpose of implementation of the semiconductor device 1. While the PMU 300 is performing the power control operation using the CMU controller 110, some of the clock control circuits 122a through 122g, for example, the clock control circuits 122f and 122g, may not respond to clock requests from the IP blocks 200 and 210.

Figure 3:
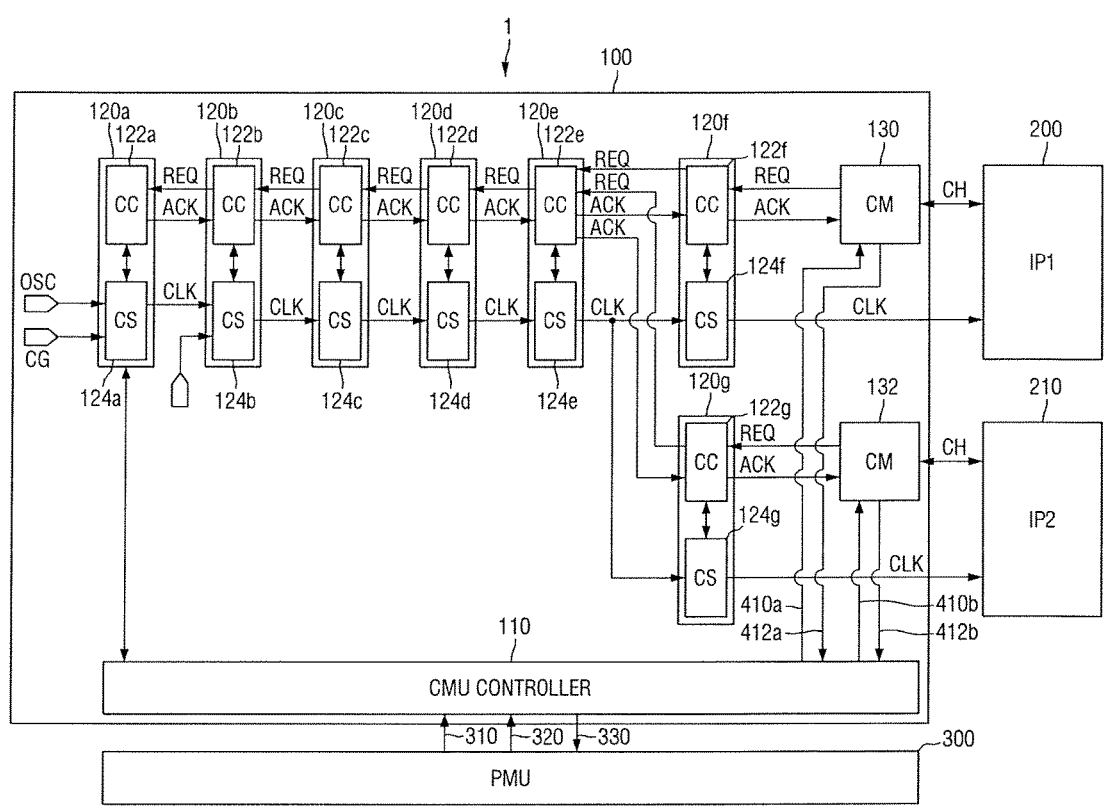
FIG. 3 is a schematic view illustrating an Example operation of a semiconductor device according to an Example embodiment of the present inventive concept.

FIG. 3 is a schematic view illustrating an operation of a semiconductor device according to an exemplary embodiment of the present inventive concept.

Referring to FIG. 3, the PMU 300 of the semiconductor device 1 sends a control command 320 to the CMU controller 110 along with a PMU clock request 310.

The control command 320 may be a bus transaction termination command. The bus transaction termination command is a command for terminating bus transactions between the channel management circuits 130 and 132 and the IP blocks 200 and 210.

The CMU controller 110 transmits bus clock requests 410a and 410b to the channel management circuits 130 and 132, respectively, according to the bus transaction termination command and receives acknowledgements 412a and 412b from the channel management circuits 130 and 132, respectively, when the channel management circuits 130 and 132 finish bus transactions. Once the CMU controller 110 completes this operation, it is guaranteed that there are no bus transactions involving the IP blocks 200 and 210, and thus, an operation such as a power-off operation can be performed on the IP blocks 200 and 210. If the IP blocks 200 and 210 are activated later and then clock requests are generated by the IP blocks 200 and 210, the CMU 100 ignores the clock requests and is controlled only by the PMU 300.

The CMU controller 110 controls the channel management circuits 130 and 132 in the aforementioned manner according to the control command 320 and sends an acknowledgement 330 to the PMU 300.

Figure 4A:
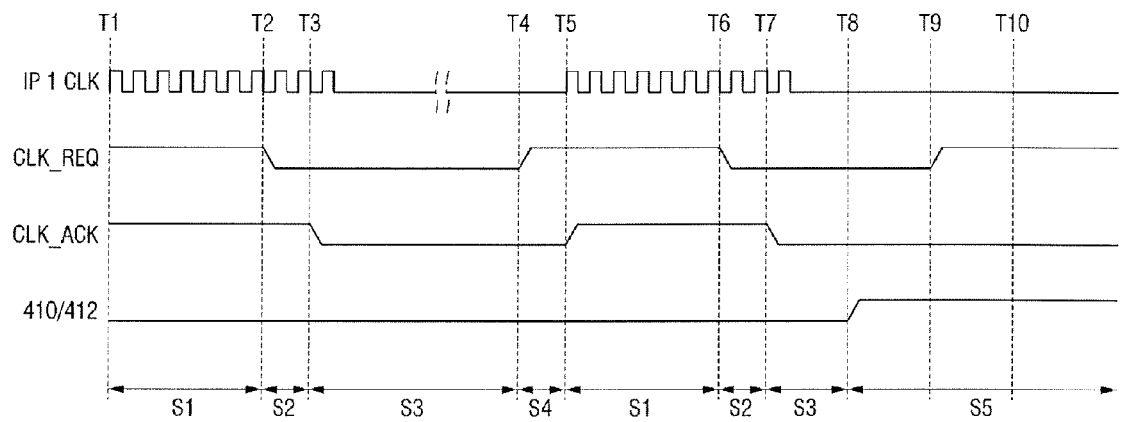
FIGS. 4A through 4C are timing diagrams illustrating operations of the semiconductor device of FIG. 3.
Figure 4B:
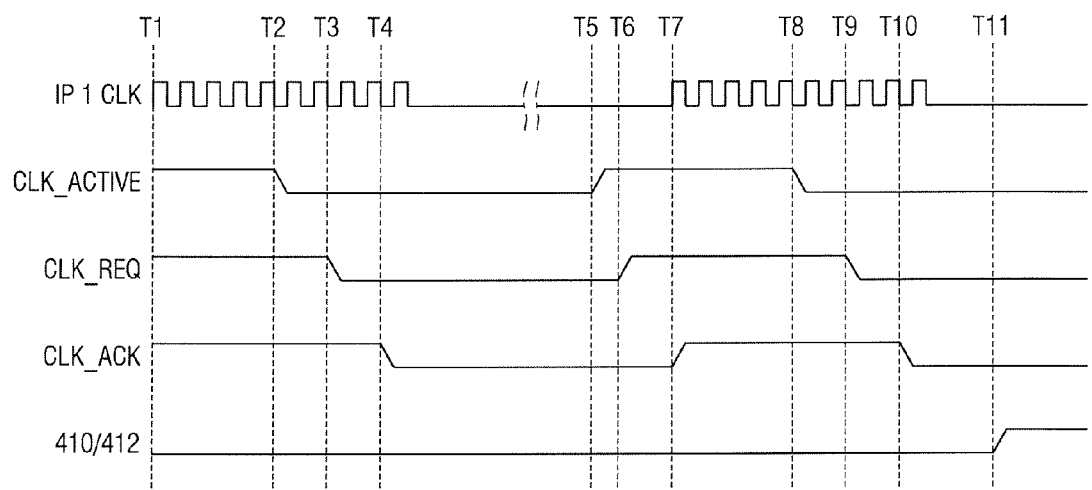
Figure 4C:
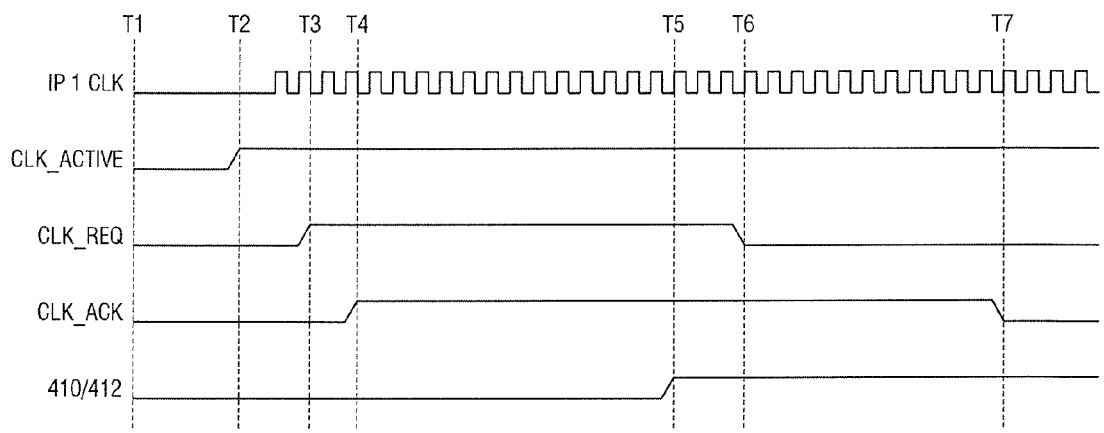
Figure 5:
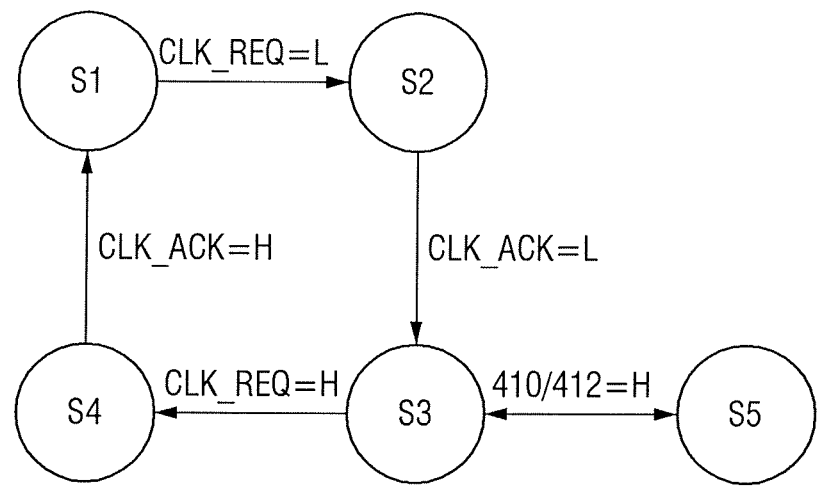
FIG. 5 is a schematic view illustrating an Example operation of the semiconductor device of FIG. 3.

FIGS. 4A through 4C are timing diagrams illustrating exemplary operations of the semiconductor device of FIG. 3, and FIG. 5 is a schematic view illustrating an exemplary operation of the semiconductor device of FIG. 3.

Referring to FIGS. 4A and 5, in response to the IP block 200 sending a request (CLK_REQ=H) for a clock signal to the channel management circuit 130 of the CMU 100 at a time T1, a clock signal "IP 1 CLK" for driving the IP block 200 is provided to the IP block 200. For example, the channel management circuit 130, in response to the request (CLK_REQ=H), may control the clock components 120a through 120f so that a clock signal CLK is supplied to the IP block 200 as the clock signal "IP 1 CLK". The IP block 200 may be in a run state S1 during a period from a time T1 to a time T2. Hereinafter, "CLK REQ=H" denotes when a request for a clock signal is in logic high; "CLK REQ=L" denotes when a request for a clock signal is in logic low. At the time T2, the IP block 200 sends a request (CLK_REQ=L) to stop providing the clock signal "IP 1 CLK". Accordingly, at a time T3, the channel management circuit 130 sends an acknowledgement (CLK_ACK=L) for the request (CLK_REQ=L) to the IP block 200 and sends a clock signal provision termination request to the clock control circuit 122f. Thereafter, the clock control circuit 122f provides an acknowledgement ACK for the clock signal provision termination request to the channel management circuit 130 and then disables the clock source 124f to stop providing the clock signal "IP 1 CLK" to the IP block 200. It is noted that the receipt of the acknowledgement (CLK_ACK=L) for the request (CLK_REQ=L) does not necessarily guarantee that the provision of the clock signal "IP 1 CLK" to the IP block 200 will be readily stopped. Rather, the receipt of the acknowledgement (CLK_ACK=L) for the request (CLK_REQ=L) simply means that the clock control circuit 122f recognizes, from the acknowledgement (CLK_ACK=L) for the request (CLK_REQ=L), that the clock component 120f no longer needs to provide the clock signal "IP 1 CLK" to the channel management circuit 130. That is, the IP block 200 can only recognize, from the acknowledgement (CLK_ACK=L) for the request (CLK_REQ=L), that the provision of the clock signal "IP 1 CLK" for driving the IP block 200 may be stopped, and the provision of the clock signal "IP 1 CLK" to the IP block 200 may actually be stopped after the time T3.

In an exemplary embodiment, during a period from the time T2 to the time T3, the IP block 200 is in a standby state S2 waiting for the provision of the clock signal "IP 1 CLK" to be stopped, and during a period from the time T3 to the time T4, the IP block 200 may enter a sleep state S3. However, the present inventive concept is not limited to thereto. For example, in an exemplary embodiment, the IP block 200 may already be in the sleep state S3 before sending the request (CLK_REQ=L) or may enter the sleep state S3 upon receipt of the acknowledgement (CLK ACK=L) for the request (CLK_REQ=L).

At the time T4, the IP block 200 sends a request (CLK_REQ=H) to resume the provision of the clock signal "IP 1 CLK". Accordingly, the channel management circuit 130 sends a request for a clock signal to the clock control circuit 122f. Then, the clock control circuit 122f enables the clock source 124f. In response to the receipt of an acknowledgement ACK from the clock control circuit 122f, the channel management circuit 130 notifies the IP block 200, at a time T5, that the provision of the clock signal "IP 1 CLK" has been resumed (CLK_ACK=H). As a result, the IP block 200 identifies that the provision of the clock signal "IP 1 CLK" for driving the IP block 200 has been resumed, and enters the run state S1. During a period from the time T4 to a time T5, the IP block 200 is in a standby state S4 waiting for the clock signal "IP 1 CLK" to be provided, and during a period from the time T5 to a time T6, the IP block 200 is in the run state S1.

At the time T6, the IP block 200 sends a request (CLK_REQ=L) to stop providing the clock signal "IP 1 CLK". Accordingly, at a time T7, the channel management circuit 130 sends an acknowledgement (CLK_ACK=L) for the request (CLKREQ=L) to the IP block 200 and sends a clock provision termination request to the clock control circuit 122f. Thereafter, the clock control circuit 122f provides an acknowledgement ACK for the clock provision termination request to the channel management circuit 130 and then disables the clock source 124f to stop providing the clock signal "IP 1 CLK" to the IP block 200. As described above, the IP block 200 may recognize, from the acknowledgement (CLK_ACK=L) for the request (CLK_REQ=L), that the provision of the clock signal "IP 1 CLK" for driving the IP block 200 may be stopped, and the provision of the clock signal "IP 1 CLK" to the IP block 200 may actually be stopped after the time T7.

During a period from the time T6 to the time T7, the IP block 200 is in the standby state S2 waiting for the provision of the clock signal "IP 1 CLK" to be stopped, and during a period from the time T7 to a time T8, the IP block 200 is in the sleep state S3.

At the time T8, the CMU controller 110 receives a bus transaction termination command from the PMU 300 and sends a bus clock request 410a to the channel management circuit 130. According to the bus clock request 410a, bus transactions between the channel management circuit 130 and the IP block 200 are all completed via the communication channel CH between the IP block 200 and the channel management circuit 130.

In an exemplary embodiment, the bus transactions between the channel management circuit 130 and the IP block 200 may be completed without using the communication channel CH between the IP block 200 and the channel management circuit 130. For example, an interface may be provided between the PMU 300 and the IP block 200 to send the bus clock request 410a directly without using the communication channel CH. For example, the bus clock request 410a may be sent directly from the PMU 300 to the IP block 200 without using the communication channel CH.

Thereafter, even if the IP block 200 sends a request (CLK_REQ=H) at a time T9 to resume the provision of the clock signal "IP 1 CLK", the channel management circuit 130 does not respond to the request (CLK_REQ=H) because the control of the channel management circuit 130 belongs only to the PMU 300. For example, the request (CLK_REQ=H), which is sent by the IP block 200 after the time T8, is no longer accepted, and the channel management circuit 130 does not provide an acknowledgement (CLK_ACK=H) to the IP block 200. During a period from the time T8 to the time T9, the IP block 200 is in a power-off-enabled state S5.

In FIG. 4B, the operation of the semiconductor device 1 further includes a signal CLK_ACTIVE compared with FIG. 4A. The IP block 200 uses the signal CLK_ACTIVE to notify the CMU 100 of the operating state of the IP block 200, for example.

More specifically, referring to FIG. 4B, at a time T5, the IP block 200 notifies the channel management circuit 130 whether it is operating using the signal CLK_ACTIVE (CLK_ACTIVE=H), and as described above with reference to FIG. 4A, in response to the receipt of an acknowledgement ACK from the clock control circuit 122f after the enabling of the clock source 124f by the clock control circuit 122f, the channel management circuit 130 notifies the IP block 200, at a time T7, that a clock signal is being provided (CLK_ACK=H). Similarly to the example of FIG. 4A, bus transactions between the channel management circuit 130 and the IP block 200 are all completed at a time T11 according to a bus transaction termination command from the PMU 300. Then, even if the IP block 200 sends a request (CLK_REQ=H) at a time T12 to resume the provision of a clock signal, the channel management circuit 130 does not respond to the request (CLK_REQ=H) because the control of the channel management circuit 130 belongs only to the PMU 300. For example, the request (CLK_REQ=H), which is sent by the IP block 200 after the time T11, is no longer accepted, and the channel management circuit 130 does not provide an acknowledgement (CLK_ACK=H) to the IP block 200.

Referring to FIG. 4C, in response to the receipt of a control command 320 such as a bus transaction termination command from the PMU 300 at a time T5, the CMU 100 sets "CLK_REQ=L", regardless of the operating state of the IP block 200, i.e., regardless of whether the IP block 200 is still operating, such that the PMU 300 has full control over the provision of a clock signal to the IP block 200.

The operation of the semiconductor device 1 is not limited to the examples of FIGS. 4A through 4C, and various modifications can be made thereto without departing from the spirit and scope of the inventive concept of the present inventive concept.

Figure 6:
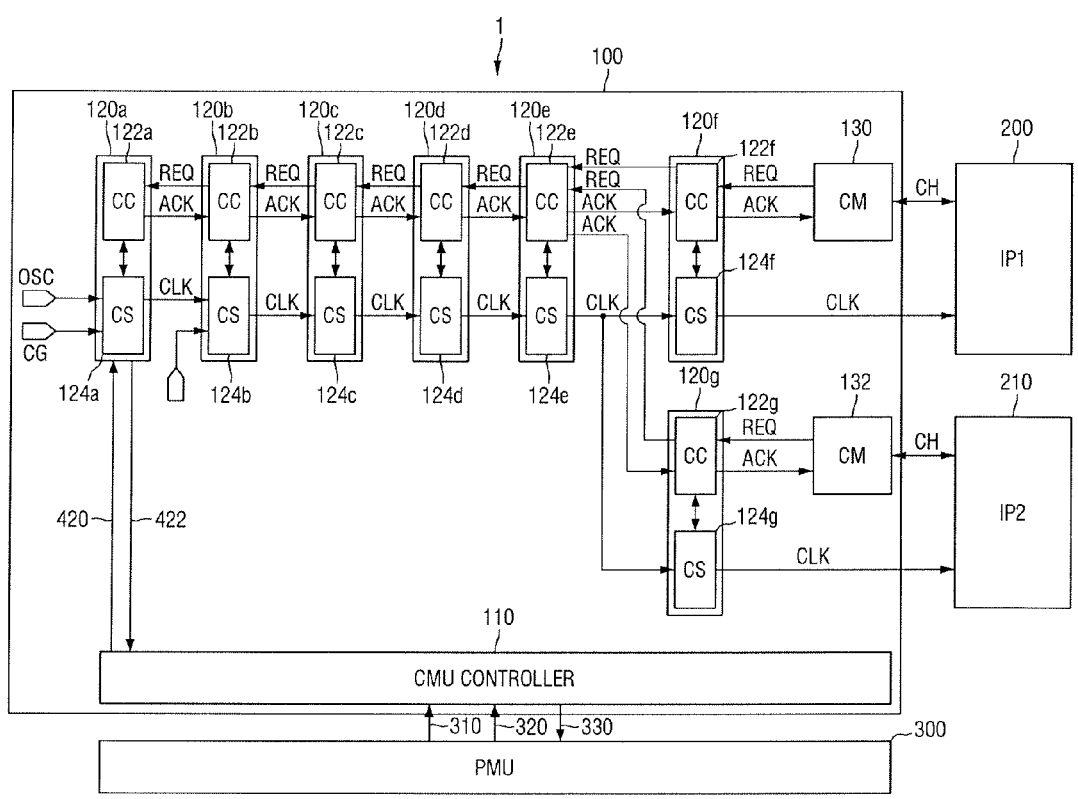
FIGS. 6 and 7 are schematic views illustrating an Example operation of a semiconductor device according to another Example embodiment of the present inventive concept.
Figure 7:
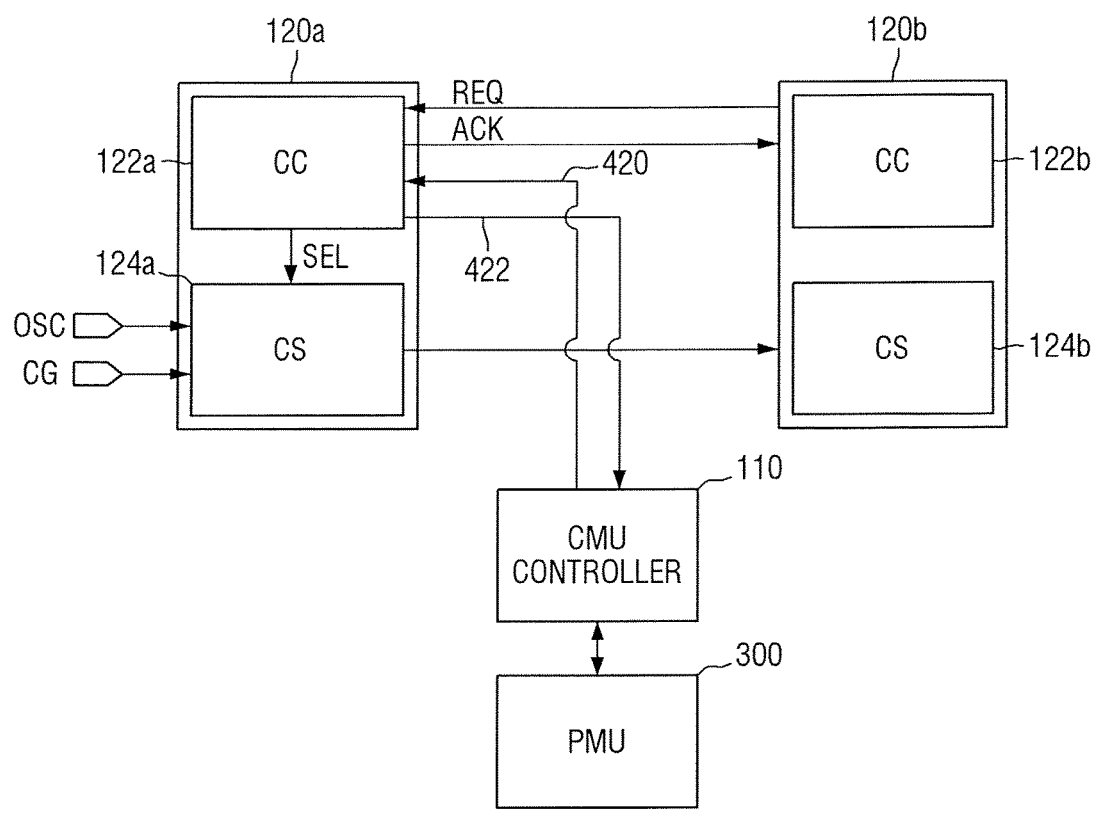

FIGS. 6 and 7 are schematic views illustrating an Example operation of a semiconductor device according to another Example embodiment of the present inventive concept.

Referring to FIGS. 6 and 7, a PMU 300 of a semiconductor device 1 sends a control command 320 to a CMU controller 110 together with a PMU clock request 310.

In an exemplary embodiment, the control command 320 may include a PLL deactivation command. The PLL deactivation command is a command to deactivate the operation of a clock generator CG and to allow a clock source 124a to receive a clock signal generated from an oscillator OSC. The clock source 124a may be a MUX circuit electrically coupled to the clock generator CG and the oscillator OSC as its inputs.

The CMU controller 110 sends a PLL clock request 420 to a clock control circuit 122a according to the PLL deactivation command, and the clock control circuit 122a deactivates the clock generator CG, allows a clock source 124a to receive a clock signal outputted from the oscillator, and receives an acknowledgement 422 from the clock control circuit 122a. In response to the CMU controller 110 completing this operation, the PLL may be disabled as necessary during a power sequence such as a power-off to reduce the power consumption by the clock generator CG. In an exemplary embodiment, the clock generator CG may include a PLL.

In an exemplary embodiment, the MUX circuit of the clock source CS may receive a clock signal from the clock generator CG and a clock signal from the oscillator OSC as its inputs, but the present inventive concept is not limited thereto. For example, the clock generator CG may include a delay locked loop (DLL) or a ring oscillator. In an exemplary embodiment, the oscillator OSC may include a ring oscillator.

The CMU controller 110 controls the clock control circuit 122a according to the control command 320 and sends an acknowledgement 330 to the PMU 300.

Figure 8:
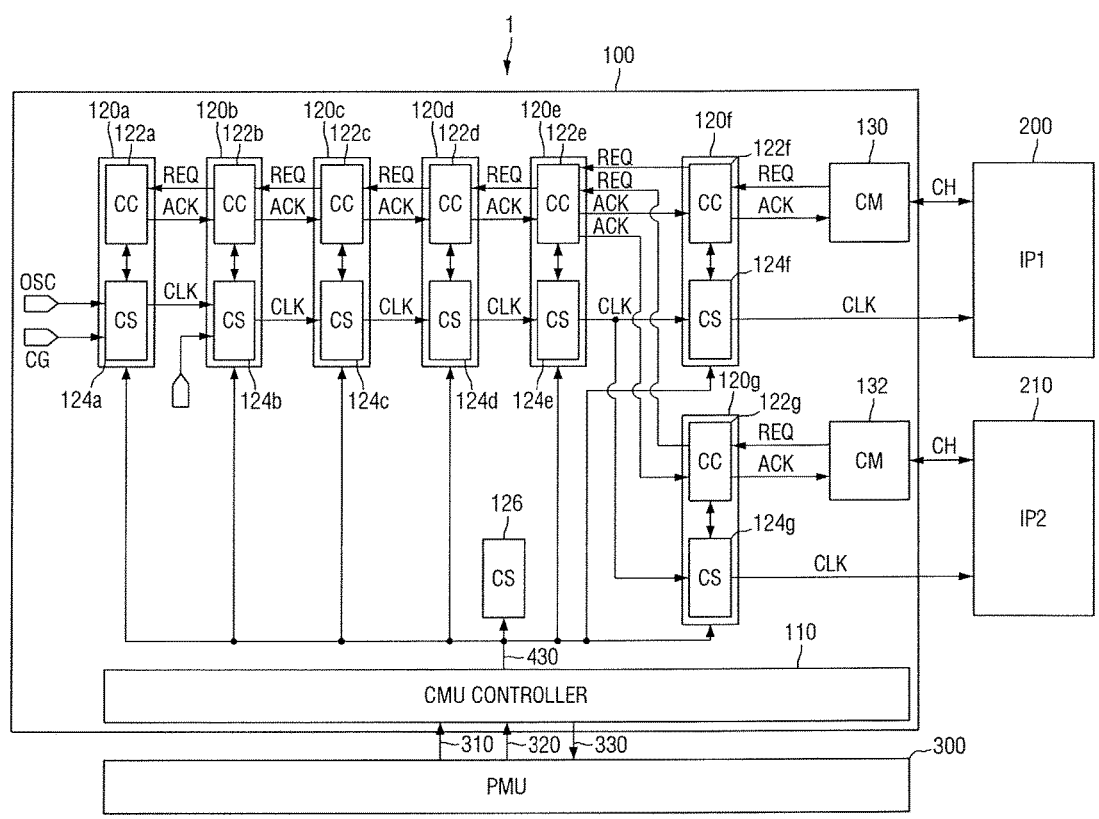
FIG. 8 is a schematic view illustrating an Example operation of a semiconductor device according to another Example embodiment of the present inventive concept.

FIG. 8 is a schematic view illustrating an operation of a semiconductor device according to an exemplary embodiment of the present inventive concept.

Referring to FIG. 8, a PMU 300 of a semiconductor device 1 sends a control command 320 to a CMU controller 110 together with a PMU clock request 310.

In an exemplary embodiment, a CMU 100 may include clock sources 124a through 124g, which are controlled hardware-wise by clock control circuits 122a through 122g, respectively, and may further include a clock source 126, which is controlled by software. The control command 320 may be a forced hardware automatic clock gating command. The forced hardware automatic clock gating command is a command to control the clock source 126 with the CMU controller 110.

The CMU controller 110 sends a control request 430 to clock components 120a through 120g and the clock source 126, which is controlled by software, according to the forced hardware automatic clock gating command, and acquires control over the clock source 126. In response to the CMU controller 110 completing this operation, the clock sources 124a through 124g and 126, which are under the control of either hardware or software, may all be controlled together as necessary during a power sequence such as a power-off.

For example, to stop a supply of a clock signal provided from the CMU 100 to IP blocks 200 and 210, the CMU controller 110 sends the control request 430 to the clock components 120a through 120g and the clock source 126, which is controlled by software, via a hardware path according to the forced hardware automatic clock gating command and may thus unify the operating modes of the clock components 120a through 120g and the clock source 126.

The CMU controller 110 controls the clock components 120a through 120g and the clock source 126, which is controlled by software, according to the control command 320 and sends an acknowledgement 330 to the PMU 300.

Figure 9:
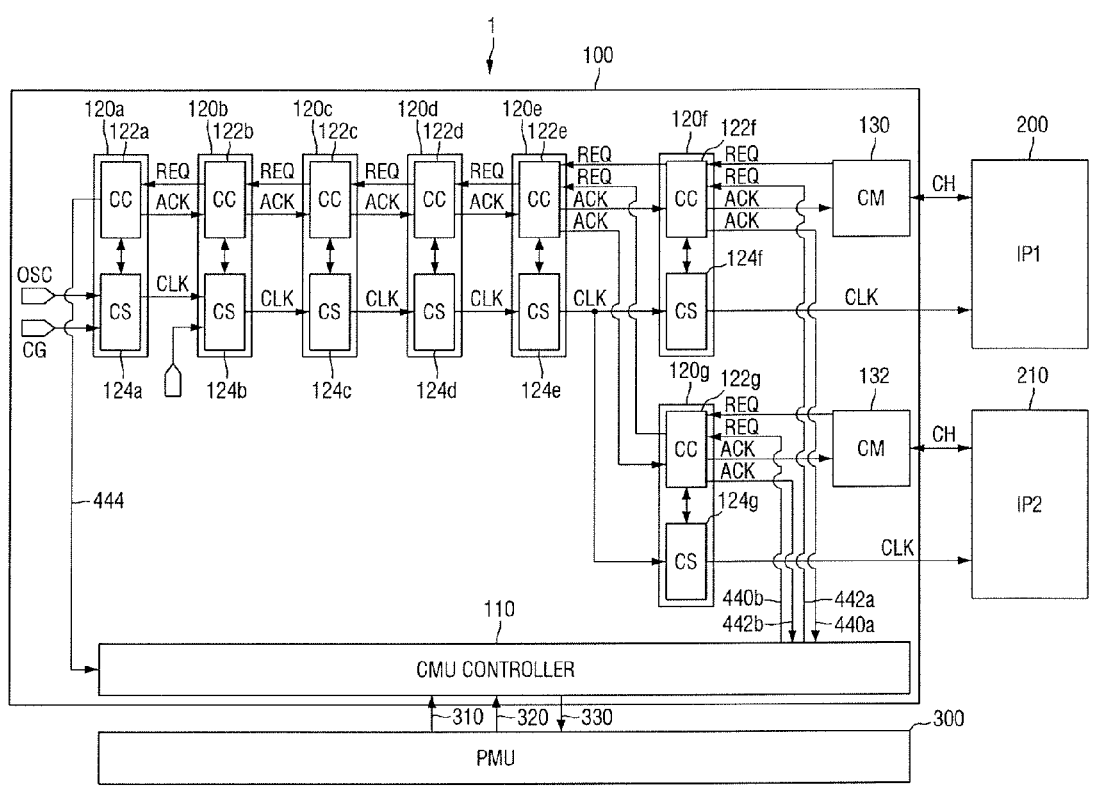
FIGS. 9 and 10 are schematic views illustrating an Example operation of a semiconductor device according to another Example embodiment of the present inventive concept.
Figure 10:
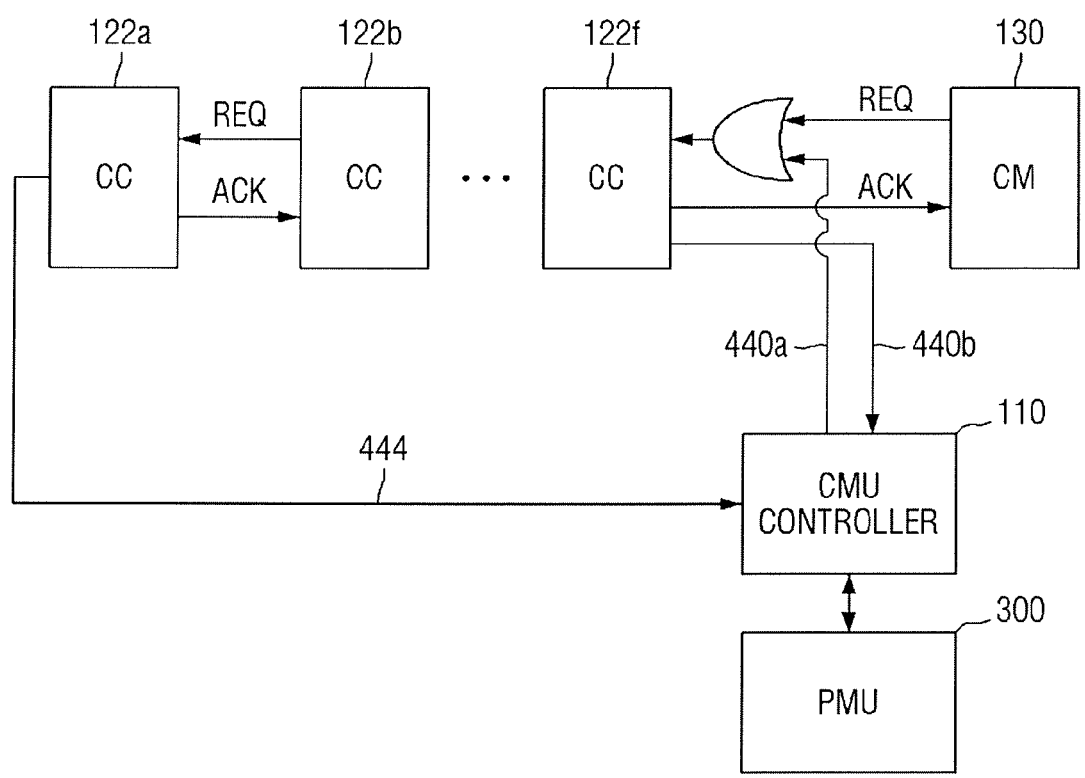

FIGS. 9 and 10 are schematic views illustrating an Example operation of a semiconductor device according to another Example embodiment of the present inventive concept.

Referring to FIGS. 9 and 10, a PMU 300 of a semiconductor device 1 sends a control command 320 to a CMU controller 110 together with a PMU clock request 310.

In an exemplary embodiment, the control command 320 may be a clock-on command or a clock-off command. The clock-on command or the clock-off command is a command for controlling clock sources 124a through 124f. The clock-on command is a command for requesting the provision of a clock signal, and the clock-off command is a command for requesting the termination of the provision of a clock signal.

The CMU controller 110 sends leaf clock requests 442a and 442b to clock control circuits 122f and 122g, respectively, according to the clock-on command or the clock-off command, and the clock control circuits 122f and 122g enable or disable the clock sources 124f and 124g, respectively, to provide a clock signal or to terminate the provision of a clock signal, and receive acknowledgements 440a and 440b, respectively, from the clock control circuits 122f and 122g, respectively. In response to the CMU controller 110 completing this operation, a reset signal may be recognized or the provision of a clock signal may be controlled for controlling a retention circuit, as necessary, during a power sequence such as a power-off or a power-on. In an exemplary embodiment, the leaf clock requests 442a and 442b may be ORed with two clock requests REQ, respectively, sent by two channel management circuits 130 and 132, respectively, to be input to the clock control circuits 122f and 122g, respectively. Accordingly, the clock control circuits 122f and 122g may handle both a request sent by an IP block 200 or 210 and a request sent by the PMU 300.

The clock control circuit 122a may transmit a root clock state signal 444 to the CMU controller 110. The CMU controller 110 may identify, from the acknowledgements 440a and 440b received from the clock control circuits 122f and 122g, respectively, that a clock signal is to be provided from the clock control circuit 122a, and may identify, from the root clock state signal 444 provided by the clock control circuit 122a, that the provision of all clock signals is to be stopped.

The CMU controller 110 controls the clock control circuit 122a according to the control command 320 and sends an acknowledgement 330 to the PMU 300.

Figure 11:
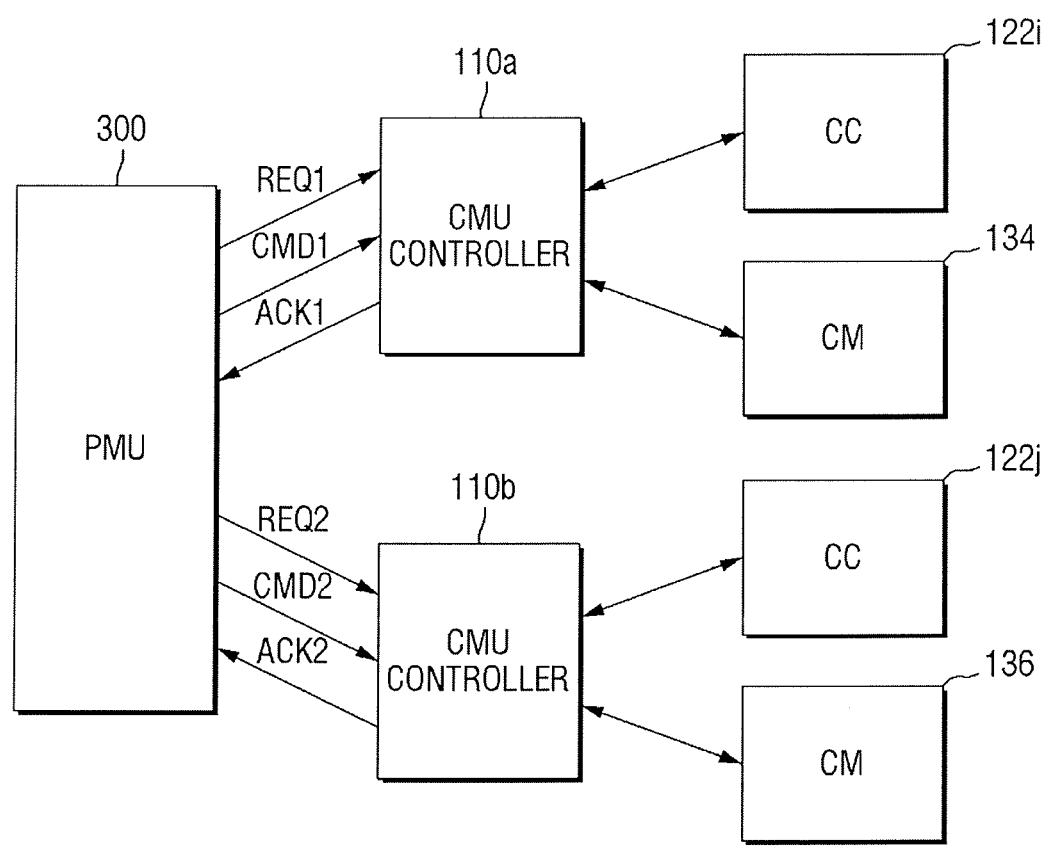
FIG. 11 is a schematic view illustrating a method of operating a semiconductor device according to another Example embodiment of the present inventive concept.

FIG. 11 is a schematic view illustrating a method of operating a semiconductor device according to an exemplary embodiment of the present inventive concept.

Referring to FIG. 11, a PMU 300 may send PMU clock requests REQ1 and REQ2 to CMU controllers 110a and 110b, respectively.

The PMU 300 sends a control command CMD1 to the CMU controller 110a together with the PMU clock request REQ1, and the CMU controller 110a controls a clock control circuit 120i or a channel management circuit 134 according to the control command CMD1 and sends an acknowledgement ACK1 to the PMU 300. The PMU 300 sends a control command CMD2 to the CMU controller 110b together with the PMU clock request REQ2, and the CMU controller 110b controls a clock control circuit 120j or a channel management circuit 136 according to the control command CMD2 and sends an acknowledgement ACK2 to the PMU 300.

An interface between the PMU 300 and the CMU controller 110a and an interface between the PMU 300 and the CMU controller 110b may be asynchronous interfaces and may be operated in a handshake manner, as described above with reference to FIG. 1.

According to an exemplary embodiment of the present inventive concept, various clock sources of a CMU can be controlled hardware-wise. Accordingly, the performance of a semiconductor device increases, and power management is performed in a system where clock signal control by hardware is implemented.

Figure 12:
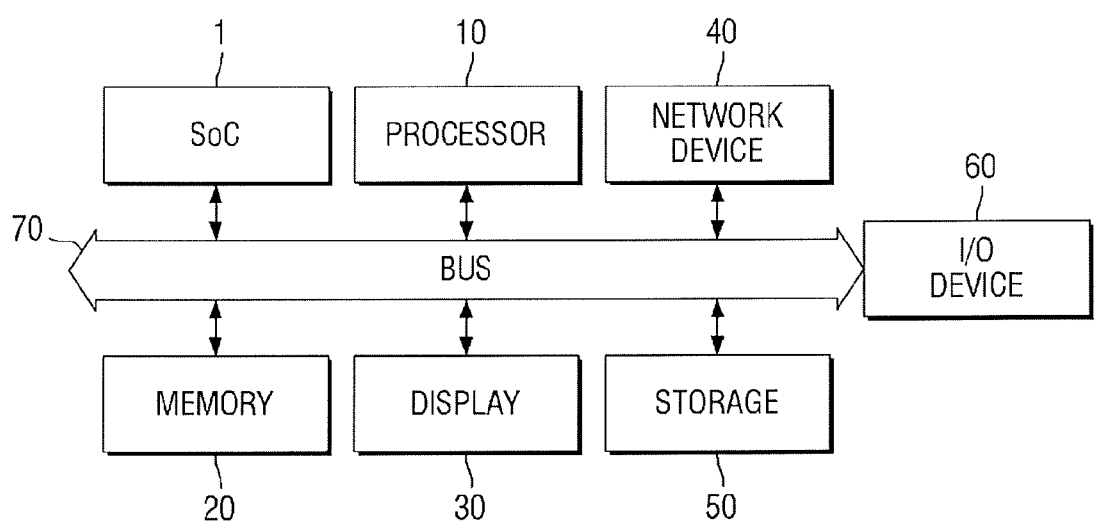
FIG. 12 is a block diagram illustrating a semiconductor system to which a semiconductor device according to some Example embodiments of the present inventive concept and an operating method of a semiconductor device according to some Example embodiments of the present inventive concept are applicable.

FIG. 12 is a block diagram of a semiconductor system to which a semiconductor device according to some Example embodiments of the present inventive concept and an operating method of a semiconductor device according to some Example embodiments of the present inventive concept are applicable.

Referring to FIG. 12, the semiconductor system may include a semiconductor device "SoC" 1, a processor 10, a memory device 20, a display device 30, a network device 40, a storage device 50, and an input/output (I/O) device 60. The semiconductor device "SoC" 1, the processor 10, the memory device 20, the display device 30, the network device 40, the storage device 50, and the I/O device 60 may exchange data with one another via a bus 70.

The semiconductor device "SoC" 1 may include at least one of a memory controller, which controls the memory device 20, a display controller, which controls the display device 30, a network controller, which controls the network device 40, a storage controller, which controls the storage device 50, and an I/O controller, which controls the I/O device 60. The semiconductor system may further include an additional processor 10, which controls at least one of the memory device 20, the display device 30, the network device 40, the storage device 50, and the I/O device 60.

Figure 13:
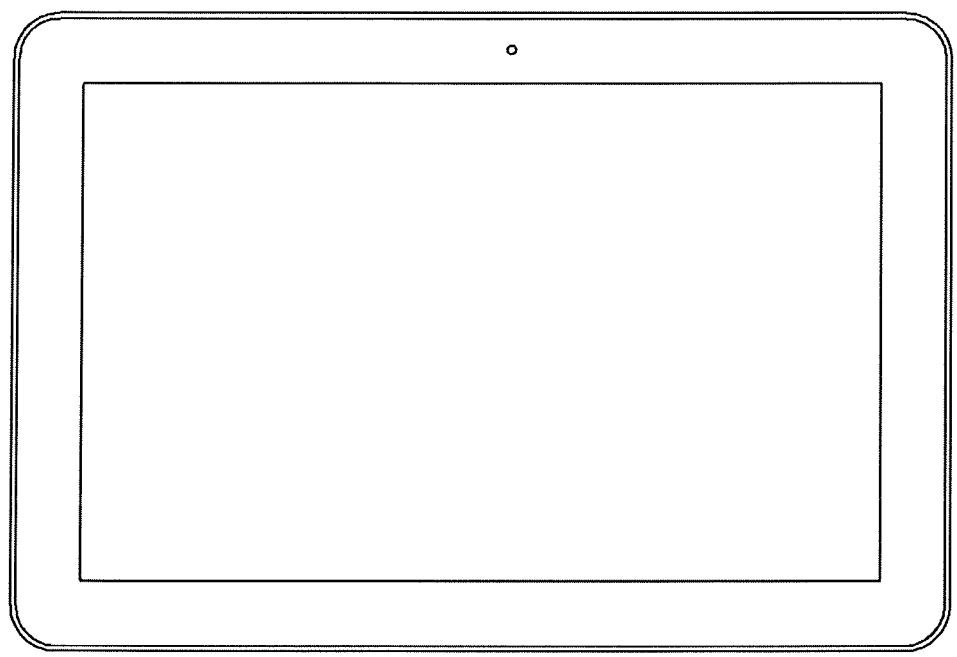
FIGS. 13 through 15 are schematic views illustrating examples of the semiconductor system of FIG. 12.
Figure 14:
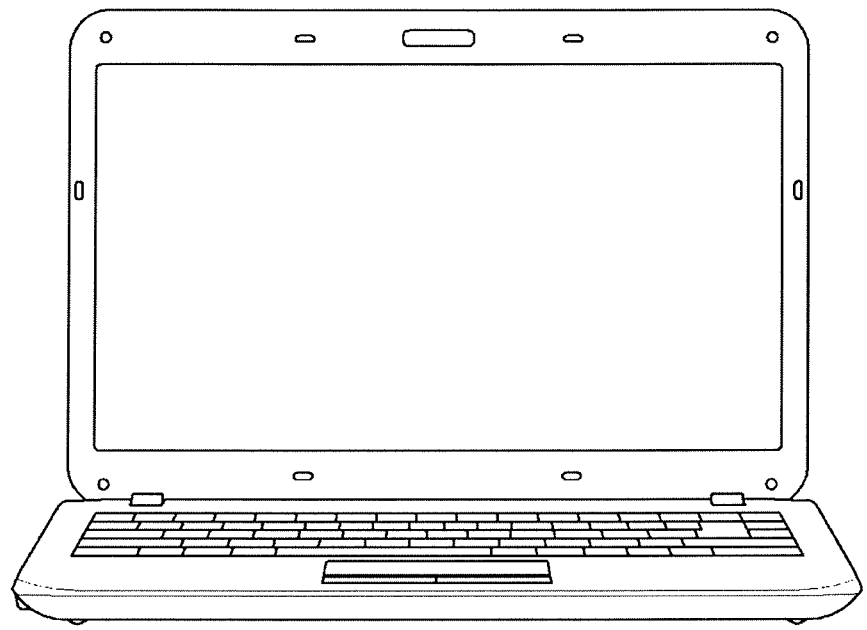
Figure 15:
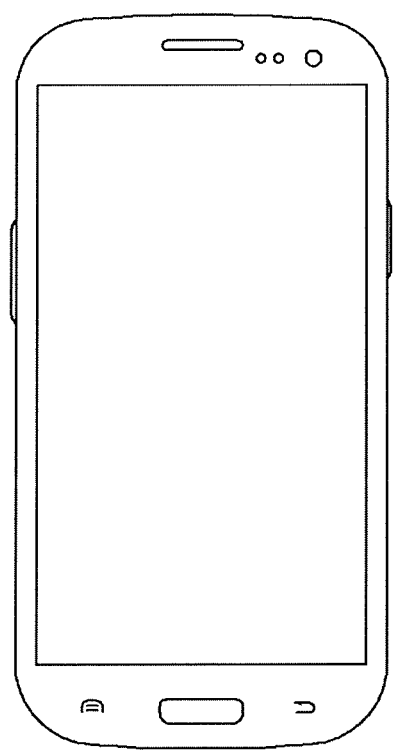

FIGS. 13 through 15 are schematic views illustrating examples of the semiconductor system of FIG. 12.

More specifically, FIG. 13 illustrates a tablet personal computer (PC) 1200, FIG. 14 illustrates a notebook computer 1300, and FIG. 15 illustrates a smartphone 1400. A semiconductor device according to some Example embodiments of the present inventive concept may be used in the tablet PC 1200, the notebook computer 1300, or the smartphone 1400.

Obviously, the semiconductor device according to some Example embodiments of the present inventive concept may also be used in various integrated circuit (IC) devices other than those set forth herein.

That is, only the tablet PC 1200, the notebook computer 1300, and the smartphone 1400 have been described herein as examples of a semiconductor system to which the inventive concept of the present inventive concept is applicable, but the present inventive concept is not limited thereto.

In some Example embodiments, the semiconductor system to which the inventive concept of the present inventive concept is applicable may also be implemented as a computer, an ultra mobile PC (UMPC), a work station, a net-book computer, a personal digital assistant (PDA), a portable computer, a wireless phone, a mobile phone, an electronic-book (e-book), a portable multimedia player (PMP), a portable game console, a navigation device, a black box, a digital camera, a 3-dimensional (3D) television set, a digital audio recorder, a digital audio player, a digital picture recorder, a digital picture player, a digital video recorder, or a digital video player.

Although the preferred embodiments of the present inventive concept have been disclosed for illustrative purposes, those skilled in the art will appreciate that various modifications, additions and substitutions are possible, without departing from the scope and spirit of the inventive concept as disclosed in the accompanying claims.

What is claimed is:

1. A semiconductor device, comprising:
a clock management unit (CMU) including a first clock control circuit controlling a first clock source, a second clock control circuit sending a first clock request to the first clock control circuit in response to an intellectual property (IP) block clock request from an IP block and controlling a second clock source, wherein the second clock source receives a clock signal from the first clock source, and a CMU controller; and
a power management unit (PMU) sending a PMU clock request to the CMU controller,
wherein the CMU provides the clock signal to the IP block in response to the PMU clock request.

2. The semiconductor device of claim 1,
wherein the PMU further sends a control command to the CMU, and
wherein the CMU controller controls the first or second clock control circuit according to the control command and then sends an acknowledgement to the PMU.

3. The semiconductor device of claim 2, further comprise:
a clock generator coupled to the first clock source; and
an oscillator coupled to the first clock source,
wherein the first clock source includes a multiplexer (MUX) circuit,
wherein the multiplexer (MUX) circuit of the first clock source is coupled to the clock generator and the oscillator, and
wherein the control command includes a PLL deactivation command for deactivating an operation of the clock generator and allowing the first clock source to receive a clock signal from the oscillator.

4. The semiconductor device of claim 3,
wherein the CMU controller sends a PLL clock request to the first clock control circuit according to the PLL deactivation command, and
wherein the first clock control circuit sends an acknowledgement to the CMU controller.

5. The semiconductor device of claim 2,
wherein the CMU further includes a third clock source,
wherein the third clock source is controlled by software, and
wherein the control command includes a forced hardware automatic clock gating command for controlling an operation of the third clock source with the CMU controller.

6. The semiconductor device of claim 2,
wherein the control command includes a clock-on command or a clock-off command for controlling an operation of at least one of the first clock source and the second clock source.

7. The semiconductor device of claim 6,
wherein the CMU controller sends a leaf clock request to the second clock control circuit according to the clock-on command or the clock-off command, and
wherein the second clock control circuit sends an acknowledgement to the CMU controller.

8. The semiconductor device of claim 6,
wherein the first clock control circuit sends a root clock state signal to the CMU controller.

9. The semiconductor device of claim 2,
wherein the CMU further includes a channel management circuit sending a second clock request to the second clock control circuit in response to the IP block clock request from the IP block, and
wherein the CMU controller controls the channel management circuit according to the control command and then sends an acknowledgement to the PMU.

10. The semiconductor device of claim 9,
wherein the control command includes a bus transaction termination command for terminating bus transactions between the channel management circuit and the IP block.

11. The semiconductor device of claim 10,
wherein the CMU controller sends a bus clock request to the channel management circuit according to the bus transaction termination command, and
wherein the channel management circuit sends an acknowledgement to the CMU controller.

12. A semiconductor device, comprising:
a CMU including a first clock control circuit controlling a first clock source, a second clock control circuit sending a first clock request to the first clock control circuit in response to an IP block clock request from an IP block, controlling a second clock source, the second clock source receiving a clock signal from the first clock source, and a CMU controller; and a PMU sending a control command to the CMU controller and receiving an acknowledgement from the CMU controller after the CMU controller performs the control command received from the PMU, wherein the CMU provides the clock signal to the IP block in response to control command.

13. The semiconductor device of claim 12,
wherein the CMU controller controls the first clock control circuit according to the control command and sends the acknowledgement to the PMU.

14. The semiconductor device of claim 13,
wherein the first clock source includes a multiplexer circuit coupled to a clock generator and an oscillator, and
wherein the control command includes a PLL deactivation command for deactivating an operation of the clock generator and allowing the first clock source to receive a clock signal from the oscillator.

15. The semiconductor device of claim 14,
wherein the CMU controller sends a PLL clock request to the first clock control circuit according to the PLL deactivation command, and
wherein the first clock control circuit sends an acknowledgement to the CMU controller.

16. The semiconductor device of claim 13,
wherein the CMU further includes a third clock source, which is controlled by software, and
wherein the control command includes a forced hardware automatic clock gating command so that the CMU controller controls an operation of the third clock source.

17. The semiconductor device of claim 13,
wherein the control command includes a clock-on command or a clock-off command for controlling an operation of the first or second clock source.

18. A semiconductor device, comprising:
a clock source generating a clock signal;
a plurality of clock components including a root clock component and a leaf clock component,
wherein the clock signal passes through the plurality of clock components, and
wherein the clock source is coupled to the root clock component,
a channel management circuit coupled to the leaf clock component;
an intellectual property (IP) block coupled to the channel management circuit and receiving the clock signal;
a CMU controller coupled to the root clock component and the channel management circuit; and
a PMU coupled to the CMU controller,
wherein the plurality of clock components is configured to send a clock request signal from the leaf clock component to the root clock component in response to an intellectual property (IP) block clock request and transfer the clock signal from the root clock component to the leaf clock component in response to an acknowledgement from a previous clock component.

19. The semiconductor device of claim 18,
wherein the channel management circuit ignores the IP block clock request in response to a command from the PMU.

20. The semiconductor device of claim 18,
wherein the clock source includes at least one of a PLL and an oscillator.

* * * * *